(12) United States Patent
Larson et al.

(10) Patent No.: US 8,909,375 B2
(45) Date of Patent: Dec. 9, 2014

(54) NODDING MECHANISM FOR A SINGLE-SCAN SENSOR

(75) Inventors: Jacoby Larson, La Mesa, CA (US); Nghia Xuan Tran, San Diego, CA (US); Michael Bruch, San Diego, CA (US); Aaron Burmeister, San Diego, CA (US); Ryan Halterman, San Diego, CA (US); Jason Lum, Santa Clara, CA (US); Mark Tjersland, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 153 days.

(21) Appl. No.: 13/480,869

(22) Filed: May 25, 2012

(65) Prior Publication Data

US 2013/0317649 A1 Nov. 28, 2013

(51) Int. Cl.
*G05B 15/00* (2006.01)
*G06F 19/00* (2011.01)

(52) U.S. Cl.
USPC ............................ 700/259; 700/245; 700/248

(58) Field of Classification Search
CPC ...... B25J 9/1697; B25J 19/023; B25J 9/1692; G05D 1/0246; G05B 2219/37572
USPC ......................................................... 700/259
See application file for complete search history.

(56) References Cited

U.S. PATENT DOCUMENTS

| | | | | |
|---|---|---|---|---|
| 6,166,744 A * | 12/2000 | Jaszlics et al. | ................ | 345/629 |
| 7,218,993 B2 * | 5/2007 | Yasukawa et al. | ............ | 700/245 |
| 7,894,951 B2 * | 2/2011 | Norris et al. | .................... | 701/36 |
| 7,969,558 B2 * | 6/2011 | Hall | ............................. | 356/5.01 |
| 2003/0216834 A1 * | 11/2003 | Allard | ........................... | 700/245 |
| 2007/0219666 A1 * | 9/2007 | Filippov et al. | ............... | 700/245 |
| 2008/0136626 A1 * | 6/2008 | Hudson et al. | ................ | 340/540 |
| 2010/0020306 A1 * | 1/2010 | Hall | ............................. | 356/5.01 |
| 2010/0053715 A1 * | 3/2010 | O 'Neill | .................... | 359/199.3 |
| 2010/0296293 A1 * | 11/2010 | Herbert | ........................ | 362/276 |
| 2011/0040427 A1 * | 2/2011 | Ben-Tzvi | .......................... | 701/2 |
| 2011/0288684 A1 * | 11/2011 | Farlow et al. | ................. | 700/264 |
| 2012/0046820 A1 * | 2/2012 | Allard et al. | .................... | 701/25 |

OTHER PUBLICATIONS

Dynamic and Autonomous Nodding LiDAR Mechanism; SD479, Aug. 2011.*
Ankit Desai et al., Objective Evaluation of Scanning Ladar Configurations for Mobile Robots, Proceedings of the IEEE/RSJ International Conference on Intelligent Robots and Systems (IROS), Oct. 2009, 2182-2189.
Johannes Strom et al., Graph-based Segmentation for Colored 3D Laser POint Clouds, Proceedings of the IEEE/RSJ International Conference on Intelligent Robots and Systems (IROS), Oct. 2010, 2131-2136.
Davide Scaramuzza et al., Extrinsic Self Calibration of a Camera and a 3D Laser Range Finder from Natural Scenes, Proceedings of the IEEE/RSJ International Conference on Intelligent Robots and Systems (IROS), Oct. 2007, 4164-4169.

* cited by examiner

*Primary Examiner* — Ian Jen
(74) *Attorney, Agent, or Firm* — SPAWAR Systems Center Pacific; Kyle Eppele; Arthur K. Samora (57) ABSTRACT

A single-scanning system for a robot can include a base and a nodding mechanism that pivotably attached to the base. A single-scan sensor such as a lidar or laser sensor can be fixed to the nodding mechanism, and a controller can be connected to the single-scan sensor and motor via a gear arrangement. The controller can manipulate nodding characteristics such as nodding range and nodding angular velocity dynamically, during operation of the robot, either in response to a command from a remote user, robot autonomy system, or according to written instructions included in the controller. An encoder disk can interconnect the nodding mechanism to the controller. With this configuration, the encoder disk can receive sensor data from the single-scan sensor, for further transmission to said controller. A transceiver can route sensor data to the remote user, and can also receive commands from the remote user.

19 Claims, 10 Drawing Sheets

NODDING MECHANISM FOR A SINGLE-SCAN SENSOR

FEDERALLY-SPONSORED RESEARCH AND DEVELOPMENT

This invention (Navy Case No. 100892) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-5118; email ssc_pac_T2@navy.mil.

FIELD OF THE INVENTION

The present invention pertains generally to single-scan sensor systems. More specifically, the present invention pertains to a method and mechanism for remotely modifying the vertical range, and/or vertical angular velocity of the single-scan system according to the needs of the user. The present invention is particularly, but not exclusively, useful as a nodding mechanism for dynamically modifying the nodding characteristics of the sensor during operation of the system.

BACKGROUND OF THE INVENTION

Most scanning lidar systems provide only a single horizontal scan of data, from 180 degrees to 360 degrees. Newer lidar systems have added more lasers or mirrors to provide multiple scan lines of data, adding a vertical three-dimensional (3D) component to the data. Yet these 3D lidar systems are in general more expensive. Thus, it is starting to become more prevalent to take a single scanning lidar system and continually change the vertical tilt, to obtain the benefit of the added vertical dimension. However, this has previously been done in a very static way, allowing the user to choose the angular ranges and velocity at the beginning of a test but leaving those parameters untouched for the duration of the test. Moreover, these systems also do not usually allow for dynamically (during operation of the system) varying ranges or angular speeds. Thus, for prior art systems, if a region of interest shows up in the data or is identified by the user, all systems need to be closed down and restarted with new parameters for range and velocity.

Another old method currently used for viewing a large area as well as a smaller region of interest is to use multiple sensors. For this method, one sensor can view the larger picture while another sensor can focus on interest regions. This method can be difficult to maintain technically, mechanically, and financially. Additionally, such systems can present integration problems, in terms of fusing the pictures of separate sensors into one coherent overall image for the user.

In view of the above, it is an object of the present invention to provide a nodding mechanism for single-scan system that, when actuated, would allow for multiple horizontal scans at varying vertical angles to establish a 3D image for a 2D single-scan system. Yet another object of the present invention is to provide a nodding mechanism for single-scan system that allows the user to modify the sensor angular range and angular velocity remotely, which would allow the lidar data to be expanded to view a large area or condensed to view a smaller region of interest. Another object of the present invention to provide a nodding mechanism for single-scan system that allows for dynamic modifications of the angular range and velocity from a remote location, in response to the user's needs and the environment encountered by the sensor. Yet another object of the present invention is to provide a nodding mechanism for a single-scan system that can automatically adjust its angular nodding speed during operation of the device to account for terrain, detected objects, and the like, to establish a "smart" operation for the system. Still another object of the present invention to provide a nodding mechanism for single-scan system that can be backfit onto pre-existing robots having 2D single-scan systems. Another object of the present invention to provide a nodding mechanism for single-scan system that can be easily manufactured in a cost-effective manner.

SUMMARY OF THE INVENTION

A single-scan system sized and adapted for attachment to a robot in accordance with several embodiments of the present invention, and methods for using the system to scan a three-dimensional (3-D) Area-Of-Interest (AOI) using such a single-scan sensor, can include a base that can be mounted to the robot and a nodding mechanism that can be pivotably attached to the base. A single-scan sensor can be fixed to the nodding mechanism, and a controller can be connected to the single-scan sensor and motor for remotely changing the nodding characteristics of the nodding mechanism. Some of the nodding characteristics that can be manipulated include nodding range and nodding angular velocity. The controller can be activated dynamically, during operation of the robot, in response to a command from a user that is remotely located from the robot. Alternatively, the robot can automatically adjust its nodding speed to account for terrain and detected objects of interest, as predetermined by non-transitory written instruction that can be incorporated into the controller.

The single-scan sensor can be a laser or a lidar sensor, and the controller can further include a gear assembly that can be attached to the nodding mechanism. A motor can be attached to the gear assembly and to the controller, and an encoder disk can be attached to the nodding mechanism and the controller. With this configuration, the encoder disk can receive sensor data from the single-scan sensor, for further transmission to the controller. The device and methods according to several embodiments can further include a transceiver that is attached to the controller. The transceiver can route the sensor data from the remote user, and the transceiver can also receive commands from the remote user.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
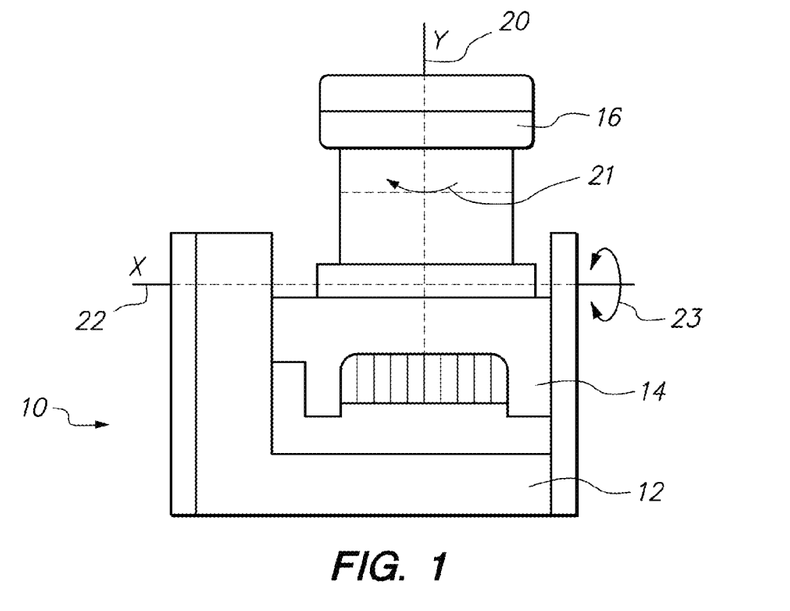
FIG. 1 is a front elevational view of the nodding mechanism according to several embodiments of the present invention.

Referring initially to FIG. 1, a nodding single-scan system according to several embodiments of the present invention is shown and is generally designated by reference character 10. As shown in FIG. 1, system 10 can include a base 12 and a nodder/nodding mechanism 14 that can be pivotably mounted to base 12 so that it rotates around x-axis 22 in the direction indicated by arrow 23. A single-scan sensor 16 can be fixed to nodder 14. The operation of sensor 16 and nodder 14 can be manipulated via a controller 18, which is located internally within base 12 and shown schematically in FIG. 4.

For purpose of this disclosure, a single-scan sensor can be defined as a sensor that can receive data in single plane. Also, for the present invention according to several embodiments, the sensor 16 can be a Hokuyo UTM-30LX laser sensor. However, other single-scan laser sensors, as well as lidar sensors and the like, could be used to practice several embodiments of the present invention. Additionally, three-dimensional (3D) lidar sensors could be used, with the vertical range of such sensors (which can be limited) being enhanced by the invention according to several embodiments where 3D sensors are used. Other sensors such as stereo vision, radars, flash lidars or any other range sensors could be used with the invention according to several embodiments. The manner in which controller 18 can control the operation of sensor 16 and nodder 14 can be described more fully below.

Figure 2A:
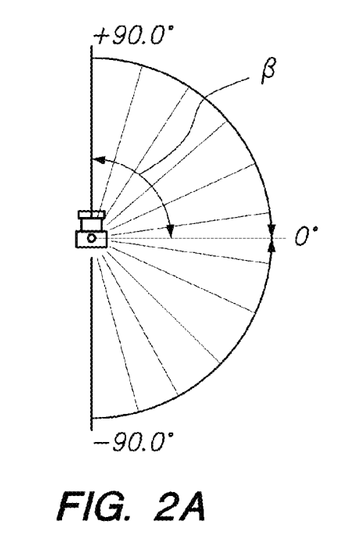
FIG. 2A is a side elevational diagram of the vertical scanning angle range β of the nodding mechanism of FIG. 1.
Figure 2B:
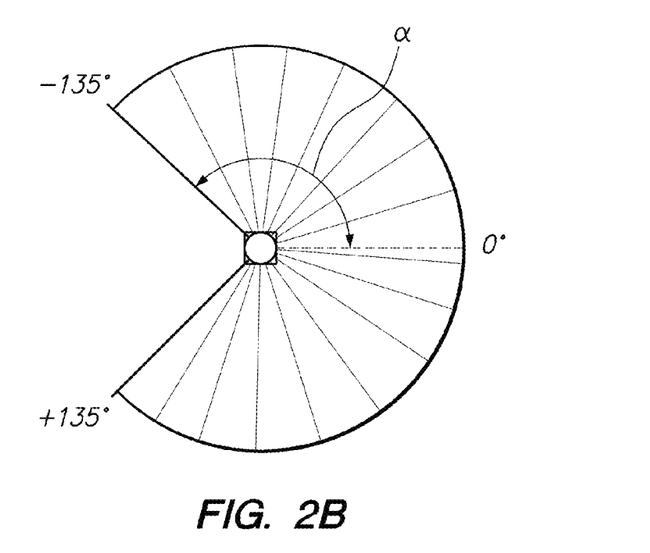
FIG. 2B is an overhead diagram of the horizontal scanning angle range α of single-scan sensor for the nodding mechanism of FIG. 1.
Figure 3:
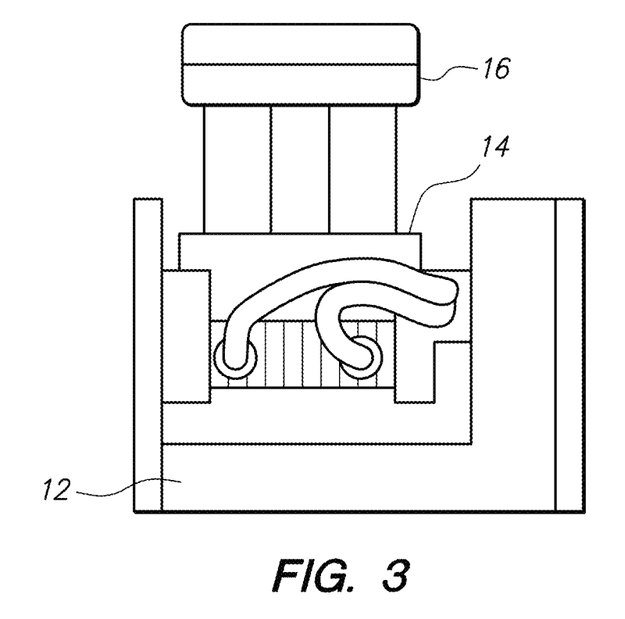
FIG. 3 is a rear elevational view of the nodding mechanism of FIG. 1, which shows the power connections for the mechanism in greater detail.

FIGS. 1, 2A and 2B can illustrate the angular scanning ranges of the system 10 according to several embodiments. As shown in FIGS. 1 and 2A, nodding mechanism 14 can rotate about the x-axis 22 in the direction shown by arrow 23 over a vertical angular range $\beta$ from $\beta=-90°$ to $\beta=+90°$ from the horizontal plane ($\beta=0°$). As shown in FIGS. 1 and 2B, sensor 16 can be set to scan in the horizontal plane in the direction indicated by arrow 21 in FIG. 1. In several embodiments, each revolution can produce sensor data of 1080 points in the angular range $\alpha$ up to a range from $\alpha=-135°$ to $\alpha=+135°$ from the straight ahead ($\alpha=0°$ in FIG. 2B) to yield a maximum Field of View (FOV) in the horizontal plane of 270°, as shown in FIG. 2B. The scanning action of sensor 16 can be set at a horizontal angular velocity of 40 revolutions per second (for this embodiment, a revolution is a cycle between $\alpha=+135°$ to $\alpha=-135°$), although other horizontal scanning speeds are certainly possible.

In several embodiments, the horizontal angular scanning characteristics of sensor 16 and the vertical angular nodding action of nodder 14 can be controlled and configured independently to yield a three-dimensional scanning result. Horizontal angular scanning range $\alpha$ and horizontal scanning speed (and by extension, horizontal scanning resolution) can be adjusted by setting sensor 16 parameters. Vertical resolution can be adjusted by controlling the vertical nodding speed, and vertical nodding range $\beta$ of nodder 14 can also be adjusted. A slower vertical nodding speed scan can yield a higher vertical resolution, while a faster nodding speed can yield a wider vertical FOV, but at the expense of resolution. Alternatively, the nodding mechanism 14 can be programmed to execute a stepped-nodding function to more carefully scan an Area-Of-Interest (AOI).

As an example of the stepped nodding function described above, and referring to FIGS. 6-8, the profile for nodder 14 can be set to establish a nodding speed 15 degrees per second of angular velocity for a nodding angular range from $\beta=+30°$ to $\beta=-30°$. To do this, and referring to FIG. 6, there are three parameters that need to be set: continue, position, and speed. A Continue parameter of "1" in the Command block (illustrated by block 56 of webpage 70 in FIG. 6) means there is at least one consecutive step, and a Continue parameter of "0" (block 57 in FIG. 6) means there are no more steps, and the nodding profile movement is to end or reset. The position parameter (block 59 in FIG. 6) sets the sensor movement to a vertical position at the speed which is set by speed parameter (block 62 in FIG. 6) in the same step. The net result is a moving profile or a single step profile, which can also be set and/or modified dynamically during operation of the system 10 without stopping the vertical angular motion of the nodder 14 or the operation of system 10. Table 1 below is an example of a two-step profile setting that can control sensor scan in the region from $\beta=-30°$ to $+30°$ at speed 15.

TABLE 1

|  | Continue | Position | Speed |
| --- | --- | --- | --- |
| Step 1: | 1 | 30 | 15 |
| Step 2: | 0 | −30 | 15 |

Figure 6:
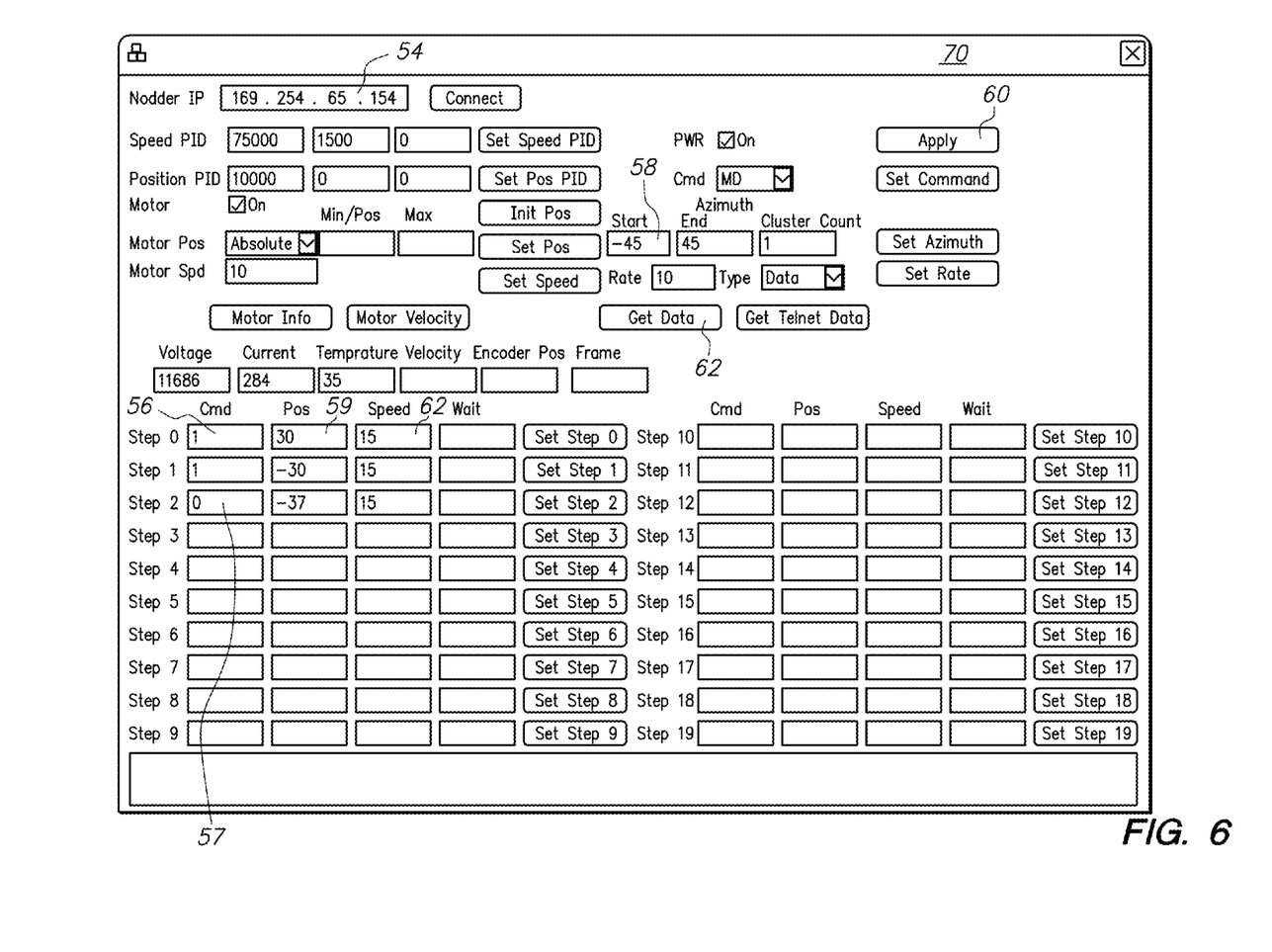
FIG. 6 is a screen shot of the UDP command webpage, which illustrates how the scanning characteristics of the nodding mechanism can be set and/or modified remotely according to several embodiments; and, FIG. 7 is a graph depicting a vertical angular velocity profile, which can be set in several "steps" in several embodiments.
Figure 7:
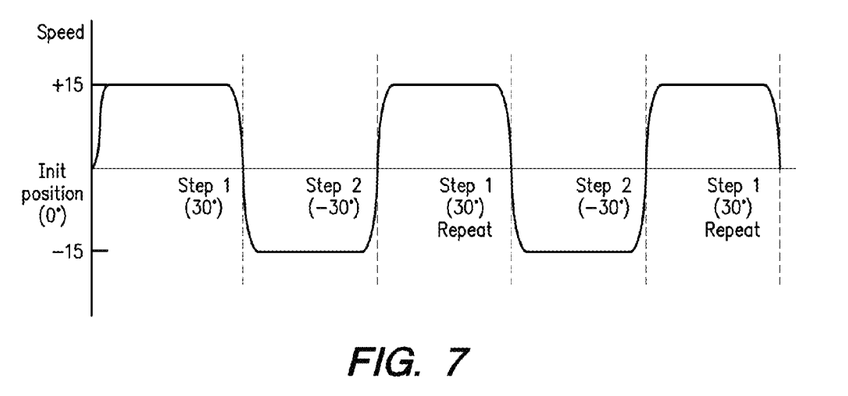

The webpage 70 in FIG. 6 and the graph shown in FIG. 7 describes the vertical scan profile of the sensor shown in Table 1. Step 1 can command the sensor to move to position $\beta=+30°$ with speed 15. As shown, the sensor quickly moves/accelerates from speed 0 to speed 15, and it keeps rotating angularly at constant speed 15 to the position $\beta=+30°$. When position $\beta=+30°$ is reached, step 2 is executed. Since the continue parameter in step 1 is set "1", the controller will next execute step 2. The sensor quickly changes direction and accelerates to speed 15 heading to be a position $\beta=-30°$ at step 2. Once step 2 is accomplished, and since the continue parameter in step 2 is set "0" to end the scanning profile, the controller repeats the profile starting at step 1 and repeats the profile cycle described in Table 1 by moving to position $\beta=+30°$ with speed 15, as described above.

Figure 8:
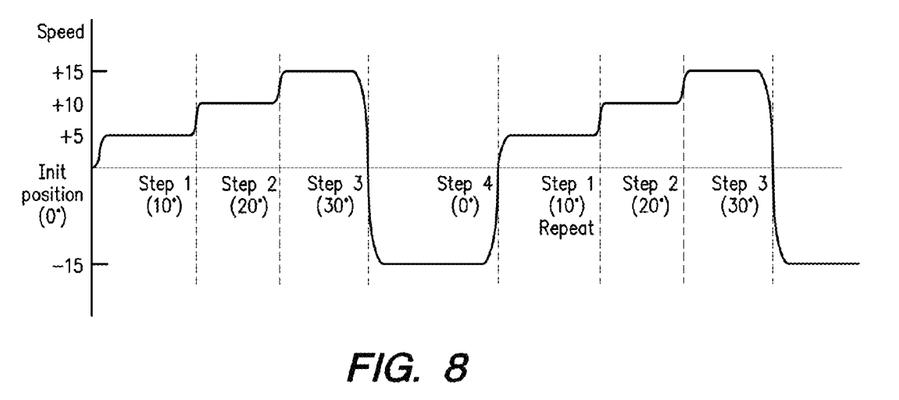
FIG. 8 is the same graph as FIG. 7, but with the vertical angular velocity profile set according to several alternative embodiments.

The graph shown in FIG. 8 illustrates an example of a four step profile setting for nodding mechanism 14 to rotate in region from 0° to +30° at three different speed 5, 10 and 15. The profile is shown in Table 2 below:

TABLE 2

|  | Continue | Position | Speed |
|---|---|---|---|
| Step 1: | 1 | 10 | 5 |
| Step 2: | 1 | 20 | 10 |
| Step 3: | 1 | 30 | 15 |
| Step 4: | 0 | 0 | 15 |

The nodding characteristics of nodding mechanism 14 can be established as described above (only two embodiments are described above, but there are a plethora of nodding profiles that can be established). As the nodding mechanism 14 "nods" according to the profile as established by the remote user, the single-scan sensor scans in a single plane. The nodding mechanism 14 and two-dimension (2D) observing sensor 16 can cooperate to thereby establish three-dimensional (3-D) observation for the combined system. An Ethernet connection can be established to allow for transmission of commands to the system 10 from a remote user, and to receive sensor data from system 10 for further transmission to the remote user. A remote user can send User Datagram Protocol (UDP) commands via website 70 (see FIG. 6) to control the operation of system 10, and to request that the system 10 send back data to the remote user (It should be appreciated, however that transport layers other than UDP could be used. Also, one example of such a format for webpage 70 is shown in FIG. 6, but other webpage formats could also be used). Stated differently, 3-D observing data in an AOI can be constructed by controlling scanning laser sensor beam in horizontal direction (via input into block 58 in FIG. 6), while at the same time manipulating nodding characteristics of the nodder 14 in the vertical direction. These two actions can be taken independently of each other, and they can also be taken by the remote user in a dynamic fashion, while the system 10 and associated robot are operating, without having to deactivate the system 10 and/or the associated robot.

As described above, the nodding angular speed and nodding angular range can be input remotely by the operator to establish a nodding profile, according to the needs of the user. Additionally, the system can adjust its nodding angular speed and angular range automatically based on what the sensor 16 "sees", according to non-transitory written instructions (firmware) that can be incorporated into controller 18. The system can also adjust its nodding characteristics based on instruction from an autonomy system controlling the robot. The automatic range tuning of the device can allow for the robot to function as a "smart" robot and automatically carry out smart applications, such as reconnaissance and obstacle avoidance. These smart applications can include, but are not limited to, a uniform scanning mode, a reduce scanning mode, a behavior driven mode, and a region of interest (ROI) mode, to name a few.

Figure 10:
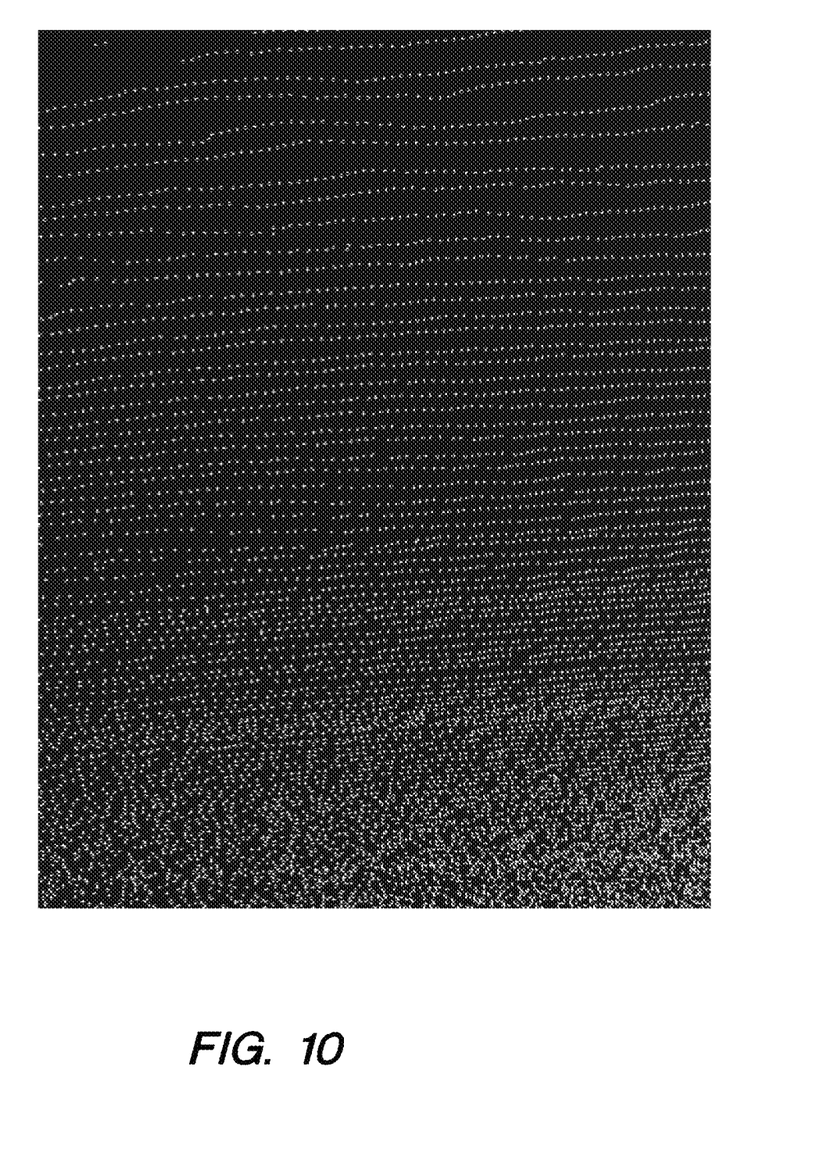
FIG. 10 is a black and white photograph of a representative scan from the nodding mechanism of FIG. 1.
Figure 11:
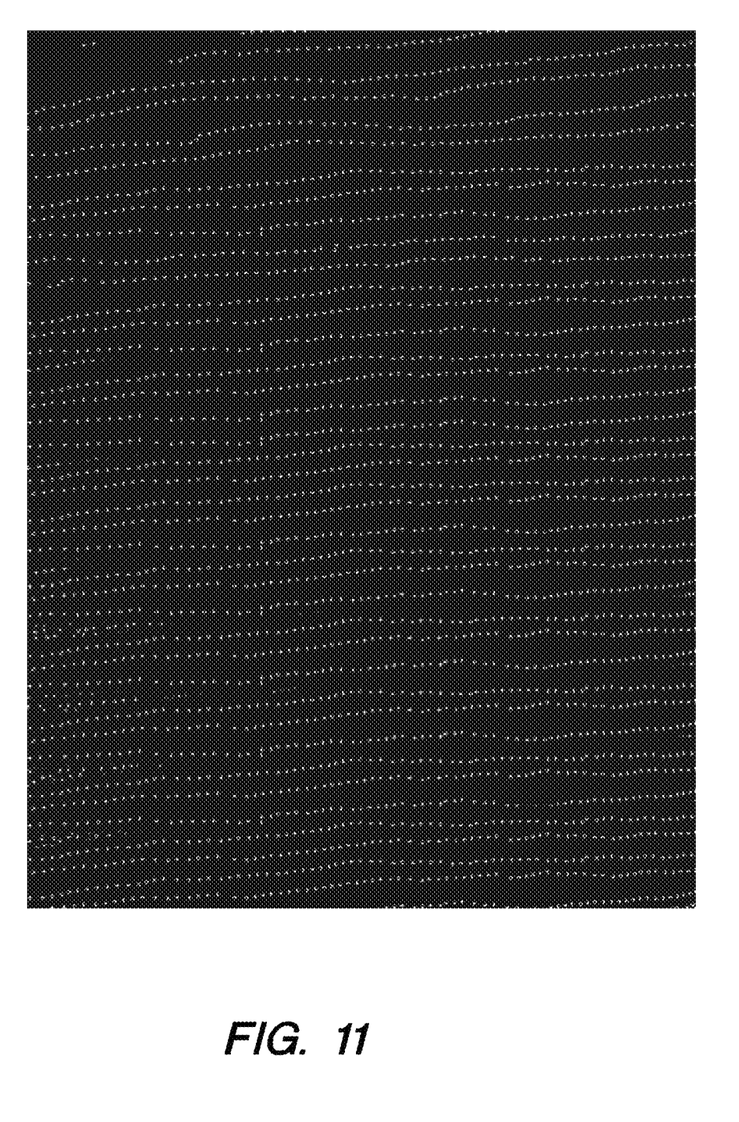
FIG. 11 is the same photograph as FIG. 10, but while the nodding mechanism is in uniform scanning mode.

For the uniform scanning mode, and referring now to FIGS. 2A and 10-11, the angular nodding range β and the angular nodding speed of the mechanism 14 can be manipulated to achieve a more uniform distance between scanned points, based on the returns received from the scan pattern of sensor 16. This is useful to reduce the number of scans (by increasing the nodding speed) that are captured in areas that are very close or that are of little interest Alternately, the number of scans farther away can be increased (by slowing the nodding speed of mechanism 14). For a small ground robot, this would reduce the number of scans observing the ground directly in front of the vehicle, which can be redundant in smooth terrain applications.

This mode would be inappropriate in areas where there were a large number of obstacles at different ranges and locations. It would most likely be more appropriate in areas of a flat plane (dirt fields, roads, parking lots, etc.). As shown in FIGS. 10-11, one method of deriving the speeds to achieve the uniform mode would be to follow a single laser at a specified horizontal angle as the tilting mechanism was nodding and measure the distance between each point. This single laser could possibly be selected because it has the flattest plane. The greatest distance would be used as a baseline for all the other ranges. This distance would be used to measure the vertical angle change and vertical tilting speed needed to achieve uniform distances between scans.

FIGS. 10-11 are representative black-and-white photographs of a sensor scan; the white dots represent returns from the single laser. As can be seen in FIG. 10, there is a concentration of white dots towards the bottom of the scan, which are indicative of the ground (returns from the ground). The aforementioned written instructions can cause the nodding mechanism 14 to "nod" with greater angular speed in these areas. The result can be seen in FIG. 11. In FIG. 11, the white dots has a more uniform spacing, as a result of self-regulating nodding of the mechanism as described above.

Figure 12:
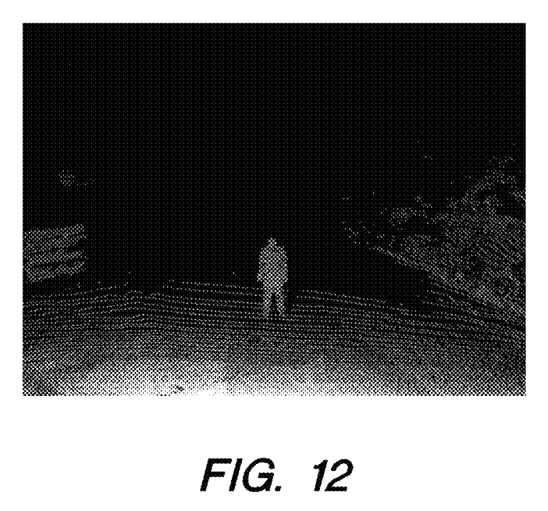
FIG. 12 is a black and white and white photograph of a scan from the nodding mechanism of FIG. 1.
Figure 13:
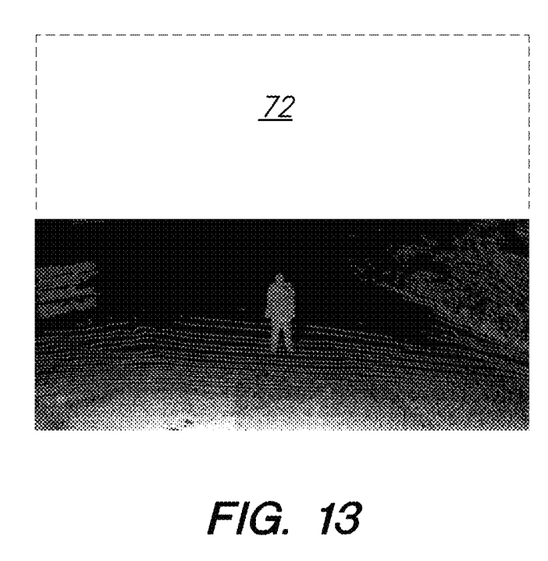
FIG. 13 is the same photograph as FIG. 12, but while the nodding mechanism is in a reduced scanning mode; and, FIG. 14 is the same photograph as FIG. 12, but while the nodding mechanism according to several embodiments is in Region of Interest (ROI) mode.

FIGS. 12 and 13 can be included to illustrate the reduce unnecessary scanning mode of the present invention, according to several embodiments. The reduce unnecessary scanning mode can either change the vertical angular nodding range β of nodder 14, or can increase the tilting speed between certain vertical angles of the mechanism 14 to reduce the number of scans that are taken of areas that have no returns. An example of an area of no returns could be during operation of the system 10 outdoors, where scans taken by sensor 16 of the sky would not yield any returns within the range limit of sensor 16. This can be determined by noting when consecutive scans produce little to no returns. FIG. 12 is a representative scan of such a situation. The black portion of FIG. 12 (roughly the top half of the FIG. 12, represented by reference character 72 in FIG. 13) represents the portion of the scan where no returns were received by sensor 16. The vertical angles β are recorded for these areas and the appropriate action is taken for those angles. The appropriate actions can be to increase the nodding speed, reduce the vertical nodding range, or both, and can be taken based on non-transitory written instructions that can be incorporated into controller 18 to accomplish this mode. In still other embodiments, if the vertical nodding range β is limited, it could be appropriate to increase the range randomly to test if the environment has changed and more returns are received in these areas. If this occurs, the vertical angular nodding range β can be increased as necessary.

The system can also adjust its nodding characteristics based on instruction from an autonomy system controlling the robot. For example if the autonomy system requires the robot to drive at high speeds the nodder will likely control the sensor to scan a shallow vertical angular nodding range β near parallel to the ground to increase detection of obstacles directly in the path of the robot. In this case the robot gives up FOV and resolution to increase perception in the critical path of the robot. Conversely if the autonomy system is in the process of mapping the interior of a building it may direct the nodder to make slow scans with a large vertical range β to get a high resolution image of the walls and surfaces in the building.

The region of interest (ROI) mode can reduce the vertical nodding speed between two vertical angles to get a more detailed scan of a specific area. The ROI can be defined by a user, who can specify the region through some input device. One representative manner of implementing the ROI mode can include drawing a rectangle in a graphical user interface (GUI) via webpage 70, entering vertical angles for the ROI via webpage 70, or entering angular nodding ranges β for detection. The ROI can also be defined by a computer program, via non-transitory instructions that can be embedded on controller. The instructions can define an ROI, and mandate a slower nodding speed within the ROI, which can result in more detailed data in the scan returns. The ROI can be defined based on detected movement, detection of objects of certain characteristics, or specified ranges for detection.

Figure 14:
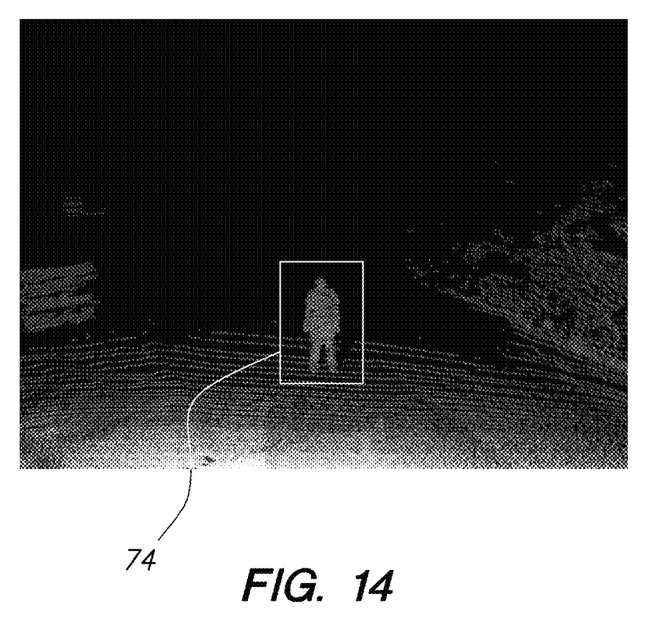

For ROI mod instances where it is desired to define the ROI based on detected movement, the written instruction (software) can cause the comparison point clouds and report anomalies. For ROI's that are based on detected objects having certain characteristics, points in the point cloud would be segmented into 3D-point clusters which, when bounded by a shape (such as a rectangular prism) would have measurable values (such as height, width, or depth) and when compared with specified values for detection, would be flagged as an ROI. This ROI mode could detect cars or humans, and is illustrated in FIG. 14. For embodiments where the ROI is based on objects that are detected at certain ranges, any points that measure within a range of distances (e.g. between 25 and 30 meters) would be detected and vertical ranges would be calculated for those points and the vertical tilting speed reduced for ROI.

Figure 4:
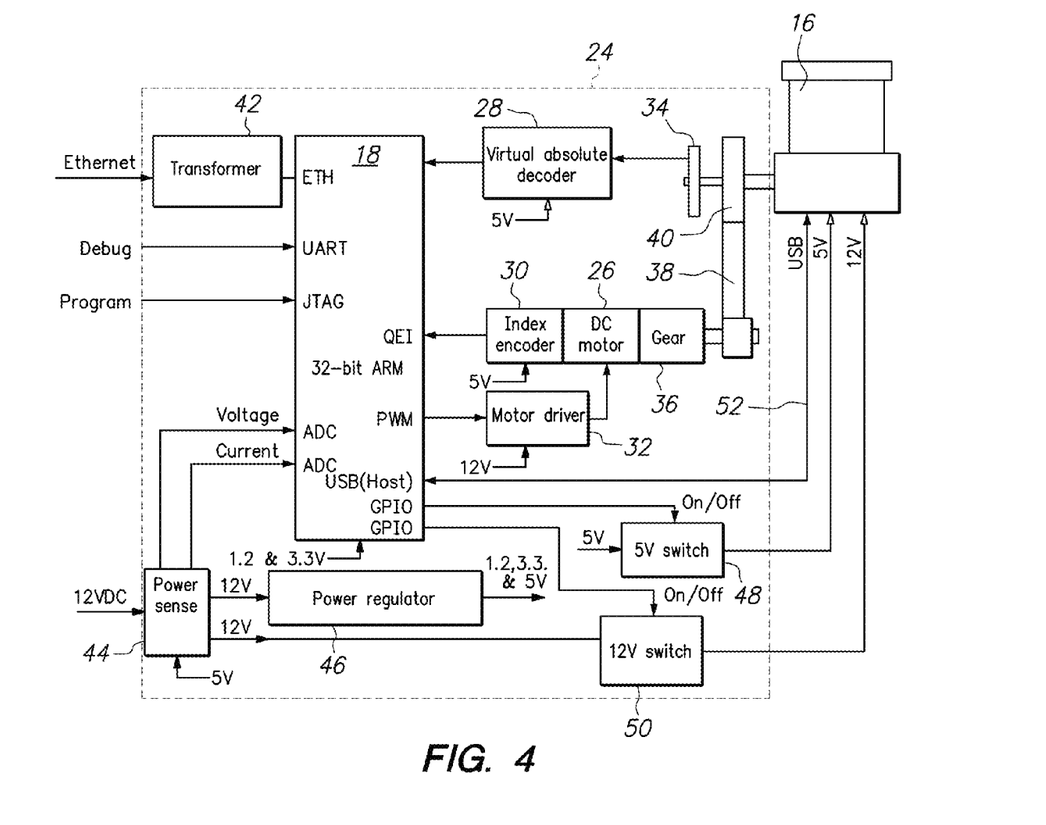
FIG. 4 is a schematic diagram of the nodding mechanism of FIG. 1.
Figure 5:
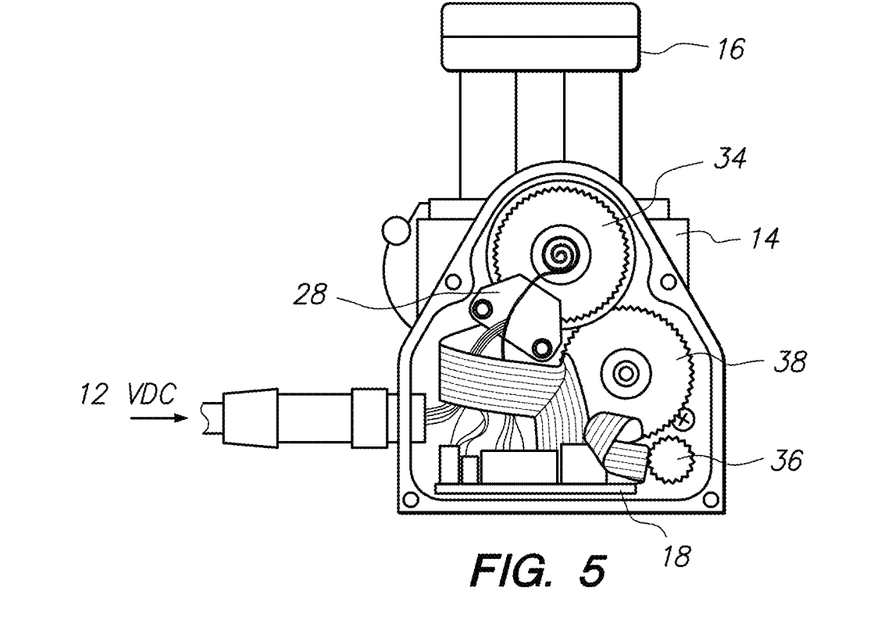
FIG. 5 a side elevational view of the nodding mechanism of FIG. 1, but with an access panel removed to illustrate the component parts of the nodding mechanism according to several embodiments in greater detail.

Referring now to FIG. 4, a schematic block diagram is presented to more fully illustrate the structure of nodder 14, as well as the relationships between the nodder 14, sensor 16 and the controller 16. FIG. 4 helps to describe the integration of the sensor 16 outside the case wall 24 of base 12 with electronic control and vertical scan motion control components inside the base 12. The main controller 18 can be a 32-bit controller manufactured by ARM, Advanced RISC (Reduced Instruction Set Computer) Machine. It should be appreciate, however, that many other common microcontrollers can also perform the functions as ARM, but they may have longer processing time or/and may required more lines of firmware code for operation. The controller 18 can have three main tasks: (1) To control the speed of direct current (DC) motor 26, which drives sensor 16 unit to rotate up and down about the x-axis 22 at the desired angular range β and at the desired angular speeds; (2) To manage a Universal Serial Bus (USB) interface with sensor 16 to read sensor data; and, (3) To provide connectivity between system 10 and a remote user via the internet and intranet, Ethernet or similar type of network to send sensor data out to a remote user via transceiver 42.

Sensor 16 can incorporate a USB or Ethernet device (i.e. have a USB input), and can use 5VDC and 12VDC for operation. As shown in FIG. 4, controller 18 can include a power sensor 44 that is used to measure voltage and current from main power supply line. The main controller 18 can periodically receive voltage and current data from power sensor 44, and if the received voltage or current is out of a permitted range, the controller 18 deactivate the system 10 to prevent damage to the system 10. A temperature sensor (not shown in FIG. 4) can be embedded in controller 18, and can also be used to monitor operation temperature. Controller 18 can further include a power regulator 46, which converts 12VDC input down to 5V, 3.3V, and 1.2V voltage inputs for the various electronic circuits of system 10 to operate. For example, a 1.2V and 3.3V inputs can be provided to controller 18. The 5V and 12V inputs to sensor 16 form regulator 46 can be transmitted from sensor 44 via 5V switch 48 and 12V switch 50, as well as to decoder 28, quadrature index encoder 30 and motor driver 32 respectively, as shown in FIG. 4. It should be appreciated, however, that different voltage inputs could be provided to different portions of the system 10 in several different embodiments.

For the position and speed control of nodding mechanism 14, the controller 18 can read two feedbacks: 1) From position decoder 28, which can be mounted with nodding mechanism 14 via encoder disk 34, to determine current vertical position of nodding mechanism 14; and, 2) From quadrature index encoder 30 mounted on the DC motor 26 to read DC motor velocity. Controller 18 can include a processor (not shown in FIG. 4), which can include non-transitory instructions (firmware) for carrying out the scanning patterns of sensor 16 and nodding function of nodder 14, according to the user's needs. Firmware running on controller 18 can perform a control algorithm and produces a proper Pulse Width Modulator (PWM) signal according to the needs of the remote user to selectively activate the DC motor 26 via motor driver 32. Output shaft gear 36 of DC motor 26 can be connected to nodder gear 40 via a reduction gear 38. As output shaft gear 36 rotates, gear 36 engages reduction gear 38 to cause rotation of the reduction gear 38, which further causes rotation of nodder gear 40 due to its engagement with reduction gear 38. With this configuration, output shaft 36, reduction gear 38 and nodder gear 40 can cooperate to cause rotation of sensor 16 about the x-axis 22 at the aforementioned angular range β and desired angular speed, which results in an angular profile as desired by the remote user.

The above structure recites a gear assembly for control of the nodding mechanism 14 by controller 18. It should be appreciated, however, that other drives, such as belt drives, chain drives, and the like could be used by the device to cause motor 36 to rotate nodding mechanism 14 as described above. Or, nodder 14 could be directly connected to motor in several embodiments.

As shown in FIG. 4, controller 18 can manage a USB interface with sensor 16 (indicated by line 52 in FIG. 4), to send commands to sensor 16 and to receive data from the sensor 16. As such, controller 18 can be considered a USB host and sensor 16 can be a USB device. The controller 18 USB host can initiate all transactions and the sensor 16 can respond to requests from the host controller 18. Commands can be sent to from the user via the Apply box 60 in webpage 70 (please see FIG. 6). The user can also request scan data manually form sensor using Get Data Box 62, which is shown in FIG. 6.

For operation of the sensor, sensor 16 can be made active. To do this, controller 18 can send signals to activate the 5V and 12V inputs to nodder 14 and sensor 16, and controller 18 can also initialize the USB enumeration process, which can be roughly analogous to the same process as plugging a USB thumb drive in to a personal computer (PC). The controller 18 can request information from sensor 16 like USB class, power requirement, and interface protocol. If for some reason, the enumeration process fails (such as due to sheared power cables or sensor 16 a defective sensor 16), the controller 18 may stop operation of the device 10.

After enumeration process is successful, the controller 18 can request other information from sensor 16. Sensor 16 can respond to each corresponding request from controller 18. For continuously receipt of sensor data from sensor 16, the controller 18 can transmit data requests to the sensor 16 and then the sensor 16 respond by transmitting a sensor data package as soon as the data package becomes is available.

Right after a previous sensor data package is received, the controller can request the next sensor data package. Each sensor 16 data package can become available when the laser beam for sensor 16 completes one sweep over horizontal angular range α. Sensor 16 laser sensor beam can sweep horizontal angular range α in constant speed at 40 cycles per second, therefore the user could receive forty (40) sensor data packages in one second. The sensor 16 data package can be short or long depends on scanning region and scanning resolution (depending on the horizontal FOV). The 12V switch can allow the remote user to activate and deactivate sensor 16 as needed. The sensor 16 can be a major power consumer for the overall system 10. If the nodder is temporarily not used, 12V-switch can be deactivated after a predetermined amount of time to save the energy. Every time when 12V switch is recycled, the controller 18 starts a new enumeration process again. All of the aforementioned processes can be run autonomously under firmware residing on controller 18.

The position decoder 28 can receive an input from encoder disk 34, which is indicative of the position of nodder 14 from β=0 (form the horizontal). For operation, the position decoder 28 requires an initial calibration for the vertical nodding motion of nodder. The initial calibration is executed during initialization of controller 18 by setting calibration parameters for a specific number (IP Address) of system 10, the specific IP address of the nodder can be input into block 54 of webpage 70 (Please see FIG. 6).

Figure 9:
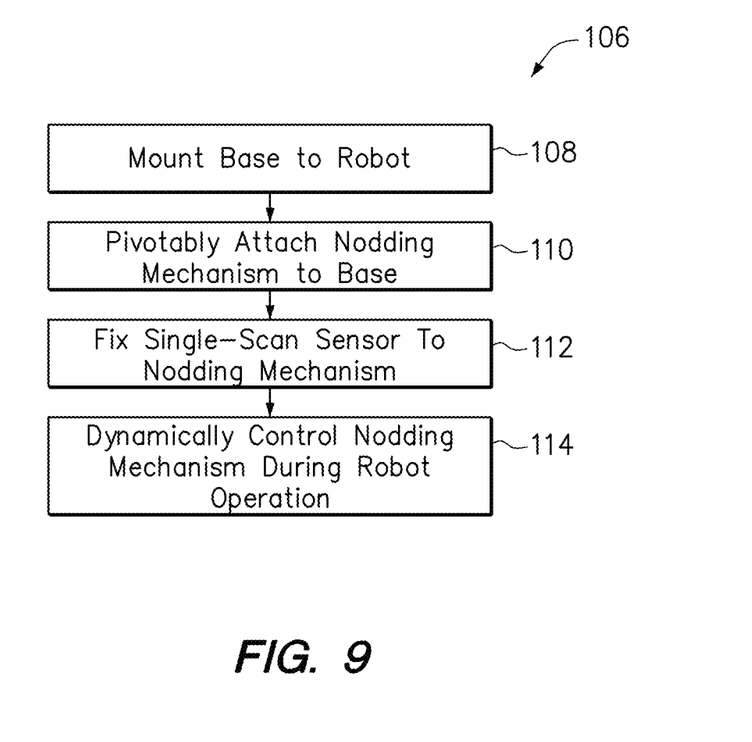
FIG. 9 is a block diagram detailing steps that can be taken to accomplish the methods according to several embodiments of the present invention.

Referring now to FIG. 9, a block diagram illustrating the methods according to several embodiments can be shown and referenced by character 106. As shown, the methods according to several embodiments can include the initial step 108 of mounting the base 12 to the robot. The methods can also include the step 110 of pivotably attached the nodder/nodding mechanism 14 to base 12, and fixing a single-scan sensor 16 to nodding mechanism 14, as indicated by step 112 of the methods according to several embodiments. Finally, the methods can include the step of dynamically controlling the nodding mechanism 14 and sensor 16 during operation of the system, as indicated by step 114. Step 114 can be taken using the structure and cooperation of structure as described above, and the nodder 14 and 16 can be controlled and manipulated either together or independently of one another by the remote user. The remote control can occur via UDP commands (or command using other net protocols) as described above. Alternatively, step 114 can be accomplished automatically by the system, according the any one of the uniform scanning, reduce scanning or ROI modes described above, to accomplish "smart operation" of the system.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A single-scanning system sized and adapted for attachment to a robot, said system comprising:
   a base mounted to said robot;
   a nodding mechanism pivotably attached to said base;
   a single-scan sensor fixed to said nodding mechanism; and,
   a controller for remotely changing nodding characteristics of said nodding mechanism during operation of the robot.

2. The system of claim 1 wherein said controller changes said nodding characteristics in response to a command from a user that is remotely located from said robot.

3. The system of claim 1 wherein said controller changes said nodding characteristics in response to non-transitory written instructions that are incorporated into said controller.

4. The system of claim 1 wherein said single-scan sensor is selected from a group consisting of laser sensors and lidar sensors.

5. The system of claim 1 wherein said controller further comprises:
   a gear assembly attached to said nodding mechanism;
   a motor attached to said gear assembly and to said controller; and,
   an encoder disk attached to said nodding mechanism and said controller, said encoder disk receiving data from said single-scan sensor for further transmission to said controller.

6. The device of claim 5 further comprising a transceiver attached to said controller, said transceiver routing said data from said controller to said remote user, said transceiver receiving commands from said remote user.

7. The device of claim 1 further wherein said nodding characteristics are selected from the group consisting of nodding range and nodding angular velocity.

8. A method for scanning an Area-Of-Interest (AOI) using a robot, said method comprising the steps of:
   A) mounting a base to said robot;
   B) pivotably attaching a nodding mechanism to said base;
   C) fixing a single-scan sensor to said nodding mechanism; and,
   D) dynamically controlling the nodding characteristics of said nodding mechanism during operation of the robot.

9. The method of claim 8 wherein said step D) is accomplished in response to a command from a user that is located remotely from said robot.

10. The method of claim 8 wherein said step D) is accomplished in response to non-transitory written instructions that are incorporated into a controller that is in communication with said nodding mechanism.

11. The method of claim 8 wherein said step D) is accomplished by decreasing the vertical nodding range of said nodding mechanism.

12. The method of claim 8 wherein said step D) is accomplished by decreasing the angular nodding speed of said nodding mechanism.

13. The method of claim 8 wherein said sensor from said step C) is selected from a group consisting of laser sensors and lidar sensors.

14. The method of claim 8 wherein said step D) further comprises the steps of:

D1) attaching a gear assembly to said nodding mechanism;

D2) connecting a motor to said gear assembly and to said controller; and,

D3) fixing an encoder disk to said nodding mechanism and said controller;

and,

D4) receiving data from said single-scan sensor, said receiving data step being accomplished by said encoder disk, for data further transmission to said controller.

15. A single-scanning robot comprising:

a base;

a nodding mechanism pivotably attached to said base;

a single-scan sensor fixed to said nodding mechanism; and, a controller for remotely changing nodding characteristics of said nodding mechanism during operation of said robot, in response to a command from a user that is remotely located from said robot.

16. The robot of claim 15 wherein said single-scan sensor is selected from a group consisting of laser sensors and lidar sensors.

17. The robot of claim 15 wherein said controller further comprises:

a gear assembly attached to said nodding mechanism;

a motor attached to said gear assembly and to said controller; and, an encoder disk attached to said nodding mechanism and said controller, said encoder disk receiving data from said single-scan sensor for further transmission to said controller.

18. The robot of claim 17 further comprising a transceiver attached to said controller said transceiver routing said data from said controller to said remote user, said transceiver receiving commands from said remote user.

19. The robot of claim 15 further wherein said nodding characteristics are selected from the group consisting of nodding range and nodding angular velocity.

* * * * *